(12) United States Patent
Wu et al.

(10) Patent No.: US 12,537,379 B2
(45) Date of Patent: Jan. 27, 2026

(54) POWER CONVERSION SYSTEM

(71) Applicant: DELTA ELECTRONICS, INC., Taoyuan (TW)

(72) Inventors: Chih-Ming Wu, Taoyuan (TW); Chien-Yu Lin, Taoyuan (TW); Ying-Hsiu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/743,141

(22) Filed: Jun. 14, 2024

(65) Prior Publication Data

US 2025/0070558 A1  Feb. 27, 2025

Related U.S. Application Data

(60) Provisional application No. 63/534,184, filed on Aug. 23, 2023.

(30) Foreign Application Priority Data

Mar. 8, 2024  (CN) .......................... 202410264634.1

(51) Int. Cl.
*H02J 3/28* (2006.01)
*H02M 1/00* (2007.01)
(Continued)

(52) U.S. Cl.
CPC ............. *H02J 3/28* (2013.01); *H02M 1/0032* (2021.05); *H02M 1/32* (2013.01); *H02M 1/4208* (2013.01);
(Continued)

(58) Field of Classification Search
CPC .......... H02J 3/28; H02M 1/0032; H02M 1/32; H02M 1/4208; H02M 3/33571;
(Continued)

(56) References Cited

U.S. PATENT DOCUMENTS 9,597,964 B2 * 3/2017 Lee ......................... H02M 1/15
11,233,420 B2 1/2022 Toyoda
(Continued)

FOREIGN PATENT DOCUMENTS

CN   102270927 A   12/2011
CN   106134034 A   11/2016
(Continued)

*Primary Examiner* — Rexford N Barnie
*Assistant Examiner* — Xuan Ly
(74) *Attorney, Agent, or Firm* — CKC & Partners Co., LLC

(57) ABSTRACT

Power conversion system includes a DC/DC conversion circuit, an energy tank, a switch, and a controller. DC/DC conversion circuit is configured to convert a first DC power into a second DC power and provide second DC power to a dynamic load. Energy tank is coupled to DC/DC conversion circuit. Switch is coupled between energy tank and DC/DC conversion circuit. Controller is coupled to energy tank and switch, and is configured to detect a first voltage of first DC power and a second voltage of second DC power to determine a change of dynamic load. When controller detects that first voltage is lower than a first preset voltage or detects that second voltage is lower than a second preset voltage, controller conducts switch so that a third DC power stored in energy tank is provided to DC/DC conversion circuit to compensate one of first DC power and second DC power.

18 Claims, 14 Drawing Sheets

(51) Int. Cl.
*H02M 1/32* (2007.01)
*H02M 1/42* (2007.01)
*H02M 3/335* (2006.01)

(52) U.S. Cl.
CPC ... *H02M 3/33571* (2021.05); *H02M 3/33584* (2013.01)

(58) Field of Classification Search
CPC .......... H02M 3/33584; H02M 1/0016; H02M 1/0022; H02M 1/007; H02M 1/15; H02M 3/1582; H02M 1/00; H02M 1/42; H02M 3/335
USPC .......................................................... 307/23
See application file for complete search history.

(56) References Cited

U.S. PATENT DOCUMENTS

| | | |
|---|---|---|
| 2002/0067630 A1 | 6/2002 | Tokunaga et al. |
| 2020/0028433 A1 | 1/2020 | Low et al. |
| 2022/0161673 A1 | 5/2022 | Jimenez Pino et al. |
| 2023/0253878 A1* | 8/2023 | Hanson .................. H02M 1/44 323/282 |

FOREIGN PATENT DOCUMENTS

| | | |
|---|---|---|
| CN | 206481220 U | 9/2017 |
| CN | 107516934 A | 12/2017 |
| CN | 107579591 A | 1/2018 |
| CN | 110445363 B | 1/2021 |
| CN | 112968453 B | 5/2023 |
| CN | 114792986 B | 8/2023 |
| EP | 3432454 A1 | 1/2019 |
| TW | 202107821 A | 2/2021 |
| WO | 2022254580 A1 | 12/2022 |

* cited by examiner

POWER CONVERSION SYSTEM

CROSS-REFERENCE TO RELATED APPLICATION

This application claims priority to U.S. Provisional Application Ser. No. 63/534,184 filed Aug. 23, 2023, and China Application Serial Number 202410264634.1, filed Mar. 8, 2024, the disclosures of which are incorporated herein by reference in their entireties.

BACKGROUND

Field of Invention

The present disclosure relates to an electronic system. More particularly, the present disclosure relates to a power conversion system to compensate for dynamic loads.

Description of Related Art

Conventional servers adopt a centralized computing mode, and a change in change in energy required can easily trigger a protection mechanism on a power supply side, causing a server to crash. An operation method of power converters on a market is to speed up a frequency response of a load and slow down a voltage drop at a bus terminal so that an output voltage measured by DC/DC meets specifications. However, it causes current distortion on an AC side and affects harmonic components of power grid.

For the foregoing reason, there is a need to provide a suitable power conversion system to solve the problems of the prior art.

SUMMARY

One aspect of the present disclosure provides a power conversion system. The power conversion system includes a DC/DC conversion circuit, an energy tank, a switch and a controller. The DC/DC conversion circuit is configured to convert a first DC power into a second DC power, and provide the second DC power to a dynamic load. The energy tank is coupled to the DC/DC conversion circuit. The switch is coupled between the energy tank and the DC/DC conversion circuit. The controller is coupled to the energy tank and the switch, and is configured to detect a first voltage of the first DC power and a second voltage of the second DC power respectively to determine a change of the dynamic load. When the controllers configured to detect that the first voltage is lower than a first preset voltage or detect that the second voltage is lower than a second preset voltage, the controller is configured to conduct the switch so that a third DC power stored in the energy tank is provided to the DC/DC conversion circuit to compensate one of the first DC power and the second DC power.

Another aspect of the present disclosure provides a power conversion system. The power conversion system includes a DC/DC conversion circuit, energy tank, a first bidirectional conversion circuit and a controller. The DC/DC conversion circuit is configured to convert a first DC power into a second DC power and provide the second DC power to a dynamic load. The energy tank is coupled to the DC/DC conversion circuit. The first bidirectional conversion circuit is coupled between the energy tank and the DC/DC conversion circuit. The controller is coupled to the energy tank and the first bidirectional conversion circuit, and is configured to detect a first voltage of the first DC power and a second voltage of the second DC power to determine a change of the dynamic load respectively. When the controller is configured to detect that the first voltage is lower than a first preset voltage or detect that the second voltage is lower than a second preset voltage, the controller is configured to conduct the first bidirectional conversion circuit, so that a third DC power stored in the energy tank is provided to the DC/DC conversion circuit to compensate one of the first DC power and the second DC power.

In view of the aforementioned shortcomings and deficiencies of the prior art, the present disclosure provides a power conversion system. When a dynamic load change occurs, even if a power factor correction (PFC) circuit is not enough to increase a bus terminal voltage to a maximum gain, a design of a power conversion system of the present disclosure buffers a voltage drop of the output terminal of a system, so that it meets specifications and will not increase current distortion on an AC side and affect harmonic components of a power grid.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
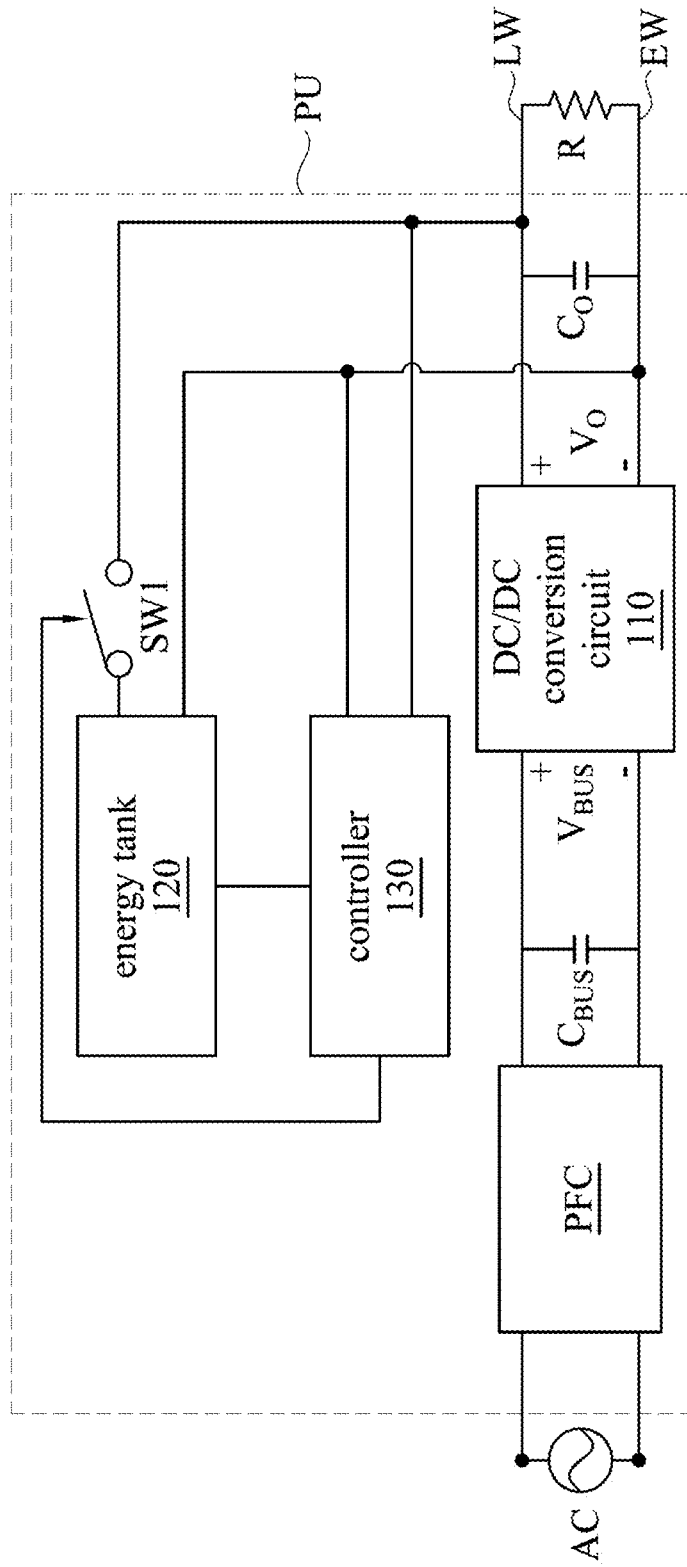
FIG. 1 depicts a schematic diagram of a power conversion system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Conventional servers adopt a centralized computing mode, and a change in energy required can easily trigger a protection mechanism on a power supply side, causing a server to crash. An operation method of power converters on a market is to speed up a frequency response of a load and slow down a voltage drop at a bus terminal so that an output voltage measured by DC/DC meets specifications. However, it causes current distortion on an AC side and affects harmonic components of power grid.

FIG. 1 depicts a schematic diagram of a power conversion system 100 according to one embodiment of the present disclosure. The power conversion system 100 includes a power device PU. In one embodiment, the power device PU can be a power converter, which can convert electricity from one form to another form. As an example, electricity is converted from Alternating Current (AC) to Direct Current (DC), electricity is converted from DC to AC, electricity is converted from AC to AC, or electricity is converted from DC to DC. In addition, the power converter can convert electricity from one voltage level to another voltage level. Following paragraphs of the present disclosure will describe how to improve aforementioned problems.

In one embodiment, the power device PU includes a DC/DC conversion circuit 110, an energy tank 120, a controller 130, a switch SW1 and a power factor correction circuit PFC. The power factor correction circuit PFC is coupled to the AC power. An input terminal of the DC/DC conversion circuit 110 (i.e., where a capacitor $C_{BUS}$ is) is electrically connected to bus terminals respectively. An output terminal of the DC/DC conversion circuit 110 (i.e., where a capacitor $C_O$ is) is electrically connected to a live wire LW and an earth wire EW of a power grid. The live wire LW and the earth wire EW are connected to a load R. The switch SW1 is electrically connected between the output terminal of the DC/DC conversion circuit 110 and the energy tank 120. The controller 130 is electrically connected to the output terminal of the DC/DC conversion circuit 110 (i.e., where a capacitor $C_O$ is). A voltage outputted by the output terminal of the DC/DC conversion circuit 110 is within a preset safe voltage range. In one embodiment, the load R represents a resistance of one or more electronic systems (e.g. a server). When a number of the electronic systems is greater, the resistance of the load R is lower.

In one embodiment, the power factor correction circuit PFC is configured to adjust an input current of a subsequent load terminal according to the AC power to output a DC power. A main purpose of the power factor correction circuit PFC is to make the input current close to a current of a purely resistive load.

In one embodiment, the DC/DC conversion circuit 110 is configured to convert a DC power into DC (or approximately DC) power at different voltages, whose power range can range from a power of a small battery to a high-voltage power supply. The DC/DC conversion circuit 110 is configured to a DC power at a bus terminal (i.e., where a capacitor $C_{BUS}$ is) into a DC power at an output terminal (i.e., where a capacitor $C_O$ is). DC power at the bus terminal and the output terminal is different.

In one embodiment, the energy tank 120 can be various types of energy storage components. For example, a lithium battery pack, a supercapacitor, an electrolytic capacitor and so on.

In one embodiment, the switch SW1 can be a bipolar junction transistor (BJT) and a Metal-Oxide-Semiconductor Field-Effect Transistor (MOSFET).

In one embodiment, the controller 130 includes but not limited to a single processor and the integration of many micro-processors, for example, a central processing Unit (CPU) or an application specific integrated circuit (ASIC). In one embodiment, the controller 130 is configured to detect the DC power at a bus terminal (i.e., where a capacitor $C_{BUS}$ is) or the DC power at the output terminal (i.e., where a capacitor $C_O$ is).

Figure 2:
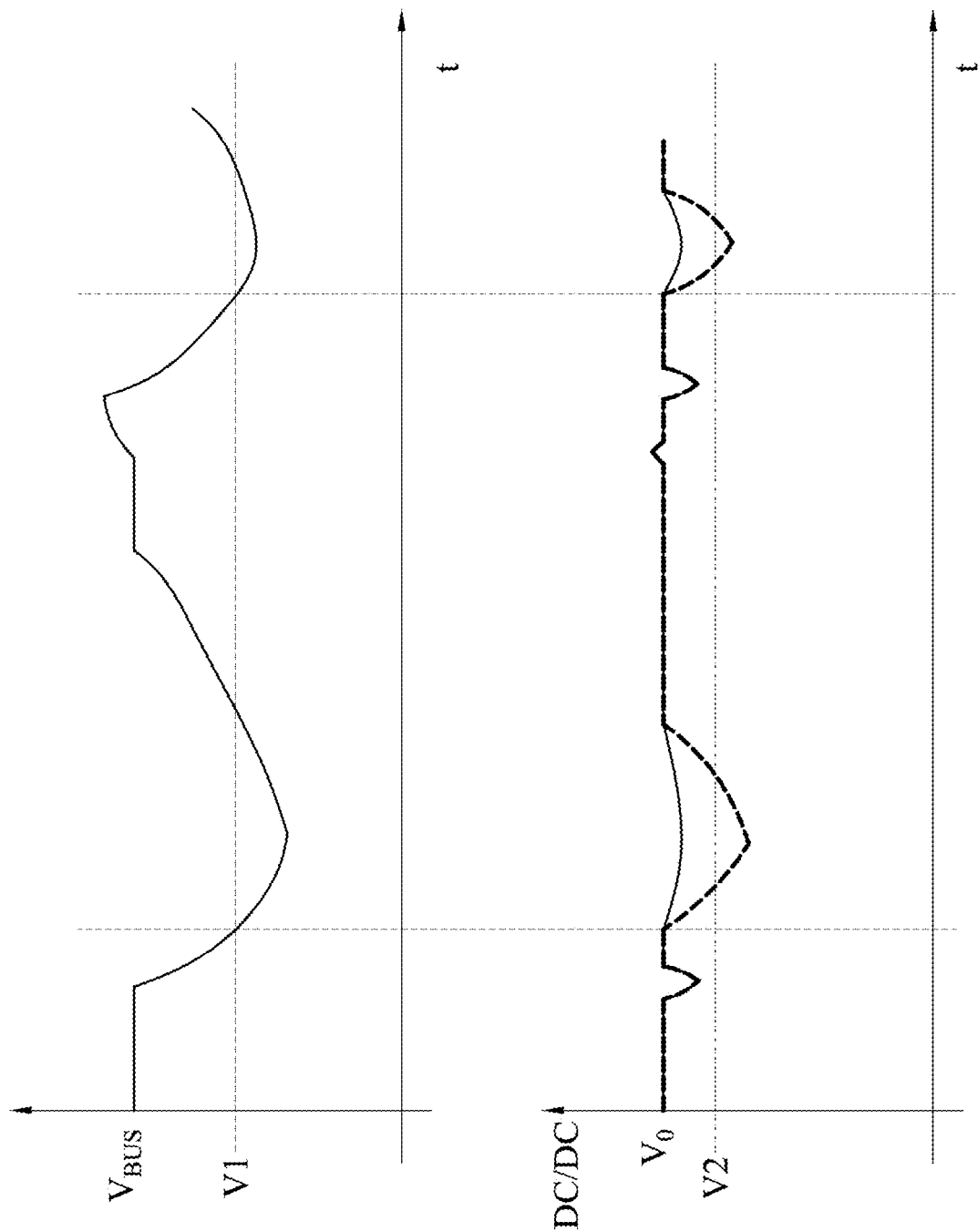
FIG. 2 depicts a schematic diagram of a bus terminal voltage and an output voltage of a power conversion system according to one embodiment of the present disclosure.

In one embodiment, in order to facilitate the understanding an operation of the power conversion system 100 in FIG. 1, please refer to FIG. 2. FIG. 2 depicts a schematic diagram of a bus terminal voltage $V_{BUS}$ (i.e., a voltage difference between two terminals of the capacitor $C_{BUS}$) and an output voltage $V_O$ (i.e., a voltage difference between two terminals of the capacitor $C_O$) of the power conversion system 100 according to one embodiment of the present disclosure. Please refer to FIG. 1 and FIG. 2, when the controller 130 is configured to detect the DC power of the energy tank 120 is lower than the preset charge value before a time point P1, the controller 130 is configured to generate a control signal to conduct the switch SW1 so that the DC/DC conversion circuit 110 is configured to charge the energy tank 120 to a voltage level or the preset charge value of the output voltage $V_O$. When the energy tank 120 is charged to the voltage level or the preset charge value of the output voltage $V_O$, the controller 130 is configured to turn off the switch SW1.

Then, when the controller 130 is configured to detect that the bus terminal voltage $V_{BUS}$ is lower than a preset voltage V1 at a time point P1 (i.e., too large load R causes a voltage drop), the controller 130 is configured to generate the control signal to conduct the switch SW1 so that a DC power stored in the energy tank 120 is provided to the output terminal of the DC/DC conversion circuit 110 to compensate the DC power of the output terminal (i.e., a voltage level of the output voltage $V_O$). Similarly, when the controller 130 is configured to detect that the bus terminal voltage $V_{BUS}$ is lower than preset voltage V1 again at a time point P2, the controller 130 will be configured to perform the aforementioned operation again to compensate for the DC power of the output terminal of the DC/DC conversion circuit 110. It should be noted that a dotted line of the output voltage $V_O$ represents a situation where dynamic load changes occur without compensation. A voltage drop at the output terminal of a system is buffered by the DC power stored in the energy tank 120, marking it within specifications without increasing the current on the AC side and affecting the harmonic components of the power grid.

In one embodiment, under a normal load operation, the energy tank 120 is configured to adjust characteristics of the switch SW1, such as an active region of BJT or a linear region of a MOSFET, so that the output terminal of the DC/DC conversion circuit 110 can charge the energy tank 120 to the voltage level of the output voltage $V_O$. When a dynamic load change occurs, the switch SW1 is operated in a saturation region and a power from the energy tank 120 is fed into the output terminal of the DC/DC conversion circuit 110, so that the output terminal can receive a large amount of buffering, thereby slowing down a voltage drop of the output voltage $V_O$. Even if the power factor correction circuit PFC response is insufficient to pull the bus terminal voltage $V_{BUS}$ back above a maximum gain of the DC/DC conversion circuit 110.

In one embodiment, please refer to FIG. 1 and FIG. 2, the controller 130 can be configured to detect whether the DC power at the output terminal of the DC/DC conversion circuit 110 (i.e., the voltage level of the output voltage $V_O$) is lower than the preset voltage V2. If the output voltage $V_O$ is lower than the preset voltage V2, the controller 130 will be configured to perform the aforementioned operations to compensate the DC power at the output terminal of the DC/DC conversion circuit 110. Detailed operations have been introduced in the aforementioned paragraphs, and detail repetitious descriptions are omitted here.

Figure 3:
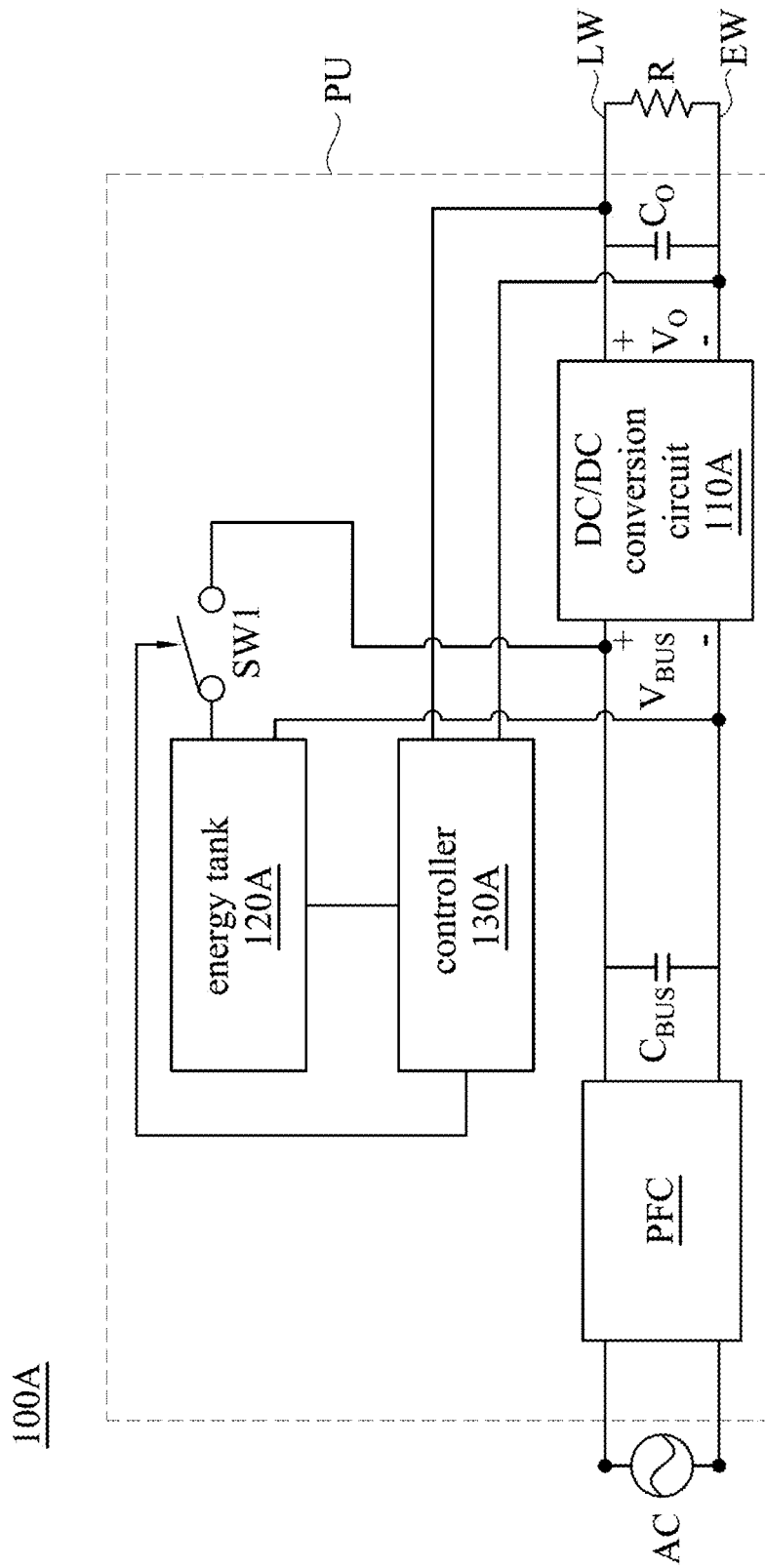
FIG. 3 depicts a schematic diagram of a power conversion system according to one embodiment of the present disclosure.

FIG. 3 depicts a schematic diagram of a power conversion system 100A according to one embodiment of the present disclosure. The power conversion system 100A includes a power device PU. The power device PU includes a DC/DC conversion circuit 110A, an energy tank 120A, a controller 130A, a switch SW1 and a power factor correction circuit PFC. Connection methods of the DC/DC conversion circuit 110A, the energy tank 120A, the controller 130A, the switch SW1 and the power factor correction circuit PFC are respectively similar to connection methods of the corresponding components in the power device PU of the power conversion system 100 in FIG. 1. For the sake of brevity, only differences are described below.

In one embodiment, compared with FIG. 1, a difference in the connection method is that switch SW1 is electrically connected to the input terminal of the DC/DC conversion circuit 110 (equivalent to the bus terminal, i.e., where a capacitor $C_{BUS}$ is).

Figure 4:
FIG. 4 depicts a schematic diagram of a bus terminal voltage and an output voltage of a power conversion system according to one embodiment of the present disclosure.

In one embodiment, in order to facilitate the understanding an operation of the power conversion system 100A in FIG. 3, please refer to FIG. 4 together. FIG. 4 depicts a schematic diagram of a bus terminal voltage $V_{BUS}$ (i.e., a voltage difference between two terminals of the capacitor $C_{BUS}$) and an output voltage $V_O$ (i.e., a voltage difference between two terminals of the capacitor $C_O$) of the power conversion system 100A according to one embodiment of the present disclosure. Please refer to FIG. 3 and FIG. 4, when the controller 130A is configured to detect that a DC power of the energy tank 120A is lower than a preset charge value before the time point P1, the controller 130A is configured to generate an operating signal to conduct the switch SW1 so that the DC/DC conversion circuit 110A is configured to charge the energy tank 120A to a voltage level or a preset charge value of the output voltage $V_O$. When the energy tank 120A is charged to the voltage level or the preset charge value of the output voltage $V_O$, the controller 130A is configured to turn off the switch SW1.

Then, when the controller 130A is configured to detect that the bus terminal volage $V_{BUS}$ is lower than a preset voltage V1 at a time point P1 (i.e., too large load R causes a voltage drop), the controller 130A is configured to generate the control signal to conduct the switch SW1 so that a DC power stored in the energy tank 120A is provided to the input terminal of the DC/DC conversion circuit 110A to compensate the DC power of the input terminal (i.e., a voltage level of bus terminal voltage $V_{BUS}$), thereby maintaining the DC power at the output terminal (i.e., the voltage level of the output voltage $V_O$) at a certain level. Similarly, when the controller 130A is configured to detect that the bus terminal voltage $V_{BUS}$ is lower than preset voltage V1 again at a time point P2, the controller 130A will be configured to perform the aforementioned operation again to compensate for the DC power of the input terminal of the DC/DC conversion circuit 110A.

In one embodiment, please refer to FIG. 3 and FIG. 4, the controller 130A can be configured to detect whether the DC power of the output terminal of the DC/DC conversion circuit 110A (i.e., the voltage of the output voltage $V_O$) is lower than a preset voltage V2. If the output voltage $V_O$ is lower than the preset voltage V2, the controller 130A will be configured to perform the aforementioned operations to compensate the DC power of the output terminal of the DC/DC conversion circuit 110A. Detailed operations have been introduced in the aforementioned paragraphs, and detail repetitious descriptions are omitted here.

Figure 5:
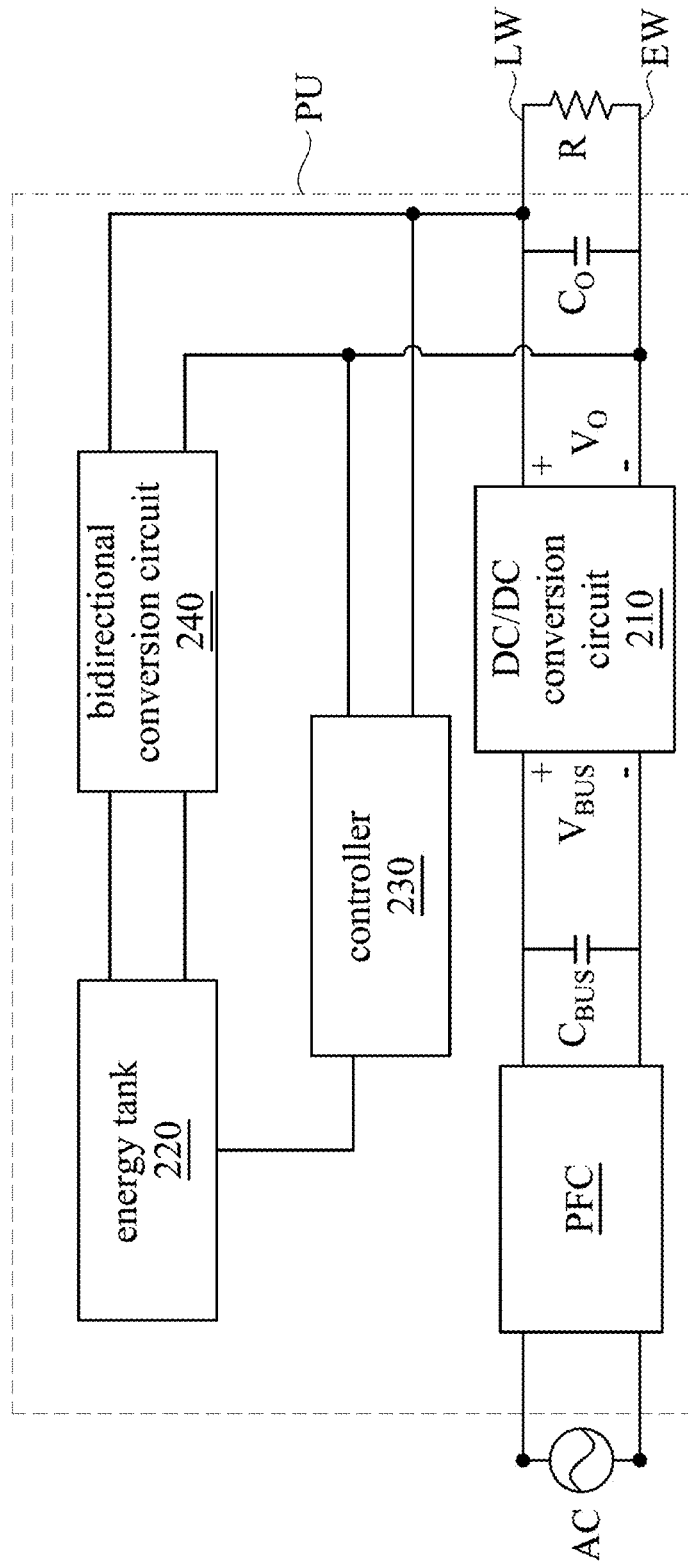
FIG. 5 depicts a schematic diagram of a power conversion system according to one embodiment of the present disclosure.

FIG. 5 depicts a schematic diagram of a power conversion system 200 according to one embodiment of the present disclosure. The power conversion system 200 includes a power device PU. The power device PU includes a DC/DC conversion circuit 210, an energy tank 220, a controller 230, a bidirectional conversion circuit 240 and a power factor correction circuit PFC. Connection methods of the DC/DC conversion circuit 210, the energy tank 220, the controller 230, the bidirectional conversion circuit 240 and the power factor correction circuit PFC are respectively similar to connection methods of the corresponding components in the power device PU of the power conversion system 100 in FIG. 1. A difference between the embodiment in FIG. 1 and the embodiment in FIG. 5 is that the switch SW1 in FIG. 1 is replace by the bidirectional conversion circuit 240.

Figure 6:
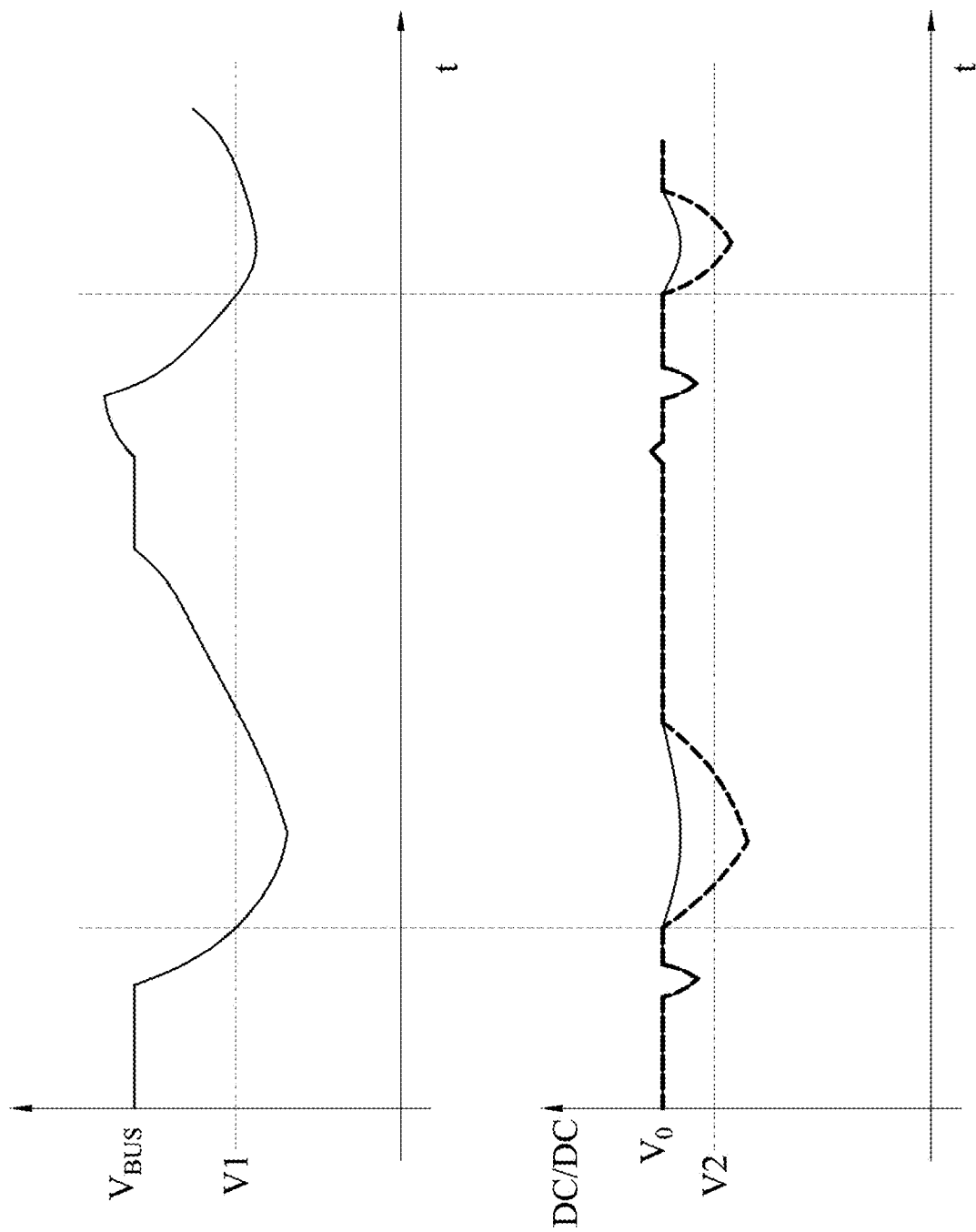
FIG. 6 depicts a schematic diagram of a bus terminal voltage and an output voltage of a power conversion system according to one embodiment of the present disclosure.

In one embodiment, in order to facilitate the understanding an operation of the power conversion system 200 in FIG. 5, please refer to FIG. 6 together. FIG. 6 depicts a schematic diagram of a bus terminal voltage $V_{BUS}$ (i.e., a voltage difference between two terminals of the capacitor $C_{BUS}$) and an output voltage $V_O$ (i.e., a voltage difference between two terminals of the capacitor $C_O$) of the power conversion system 200 according to one embodiment of the present disclosure. Please refer to FIG. 5 and FIG. 6, when the controller 230 is configured to detect that a DC power of the energy tank 220 is lower than a preset charge value before the time point P1, the controller 230 is configured to output a control signal and switch a voltage level of the control signal to switch the bidirectional conversion circuit 240 to a charging mode so that the DC/DC conversion circuit 210 is configured to charge the energy tank 220 to a voltage level or a preset charge value of the output voltage $V_O$. When the energy tank 220 is charged to the voltage level or the preset charge value of the output voltage $V_O$, the controller 230 is configured to switch the voltage level of the control signal to switch the bidirectional conversion circuit 240 to a standby mode.

Then, when the controller 230 is configured to detect that the bus terminal voltage $V_{BUS}$ is lower than a preset voltage V1 (i.e., too large load R causes a voltage drop) at a time point P1, the controller 230 is configured to switch the voltage level of the control signal to switch the bidirectional conversion circuit 240 to a charging mode so that the DC power of the energy tank 220 is provided to the output terminal of the DC/DC conversion circuit 210 to compensate the DC power of the output terminal of the DC/DC conversion circuit 210.

Figure 7:
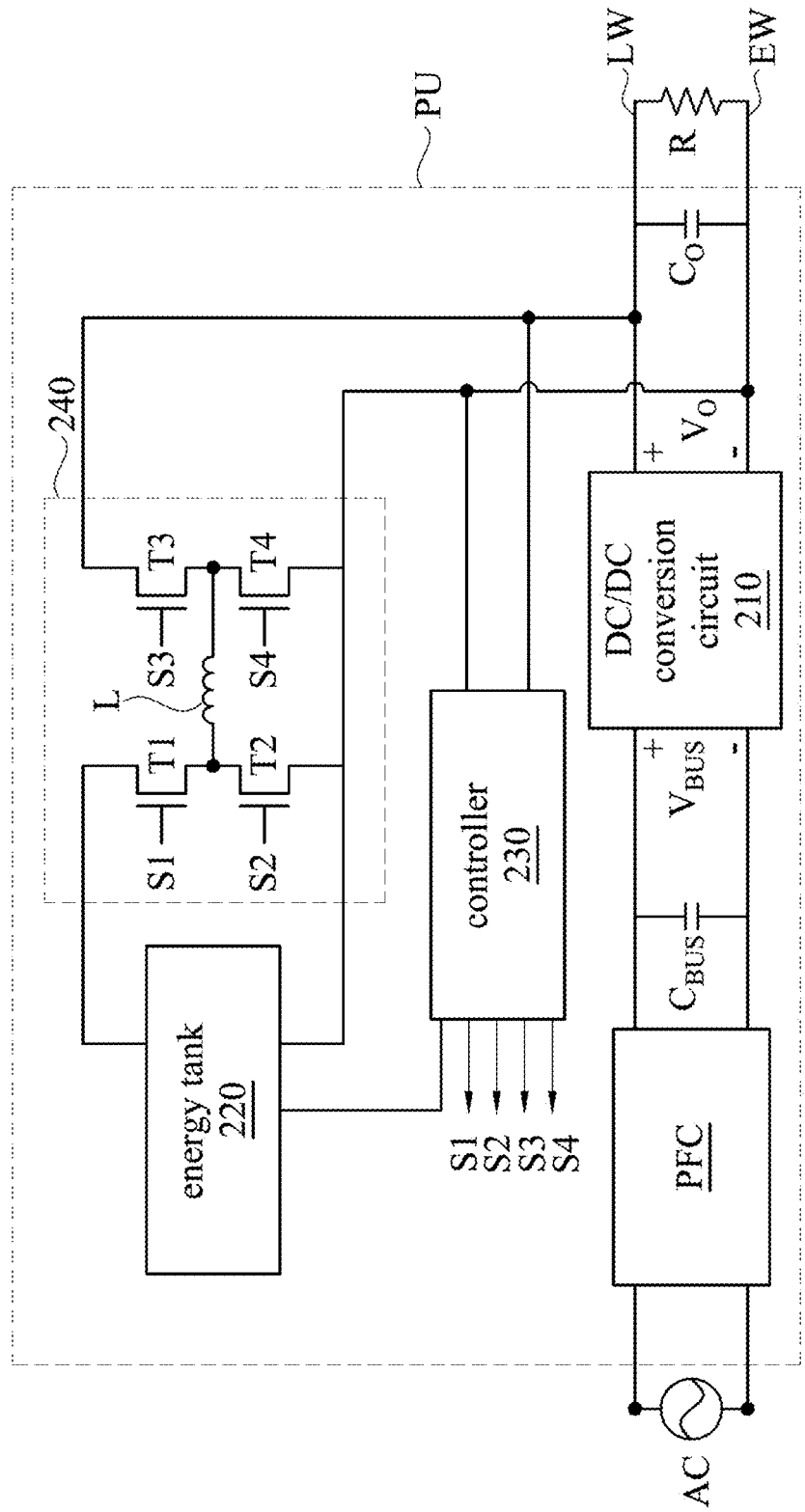
FIG. 7 depicts a schematic diagram of a bidirectional conversion circuit of a power conversion system according to one embodiment of the present disclosure.

Furthermore, please refer to FIG. 7, FIG. 7 depicts a schematic diagram of the bidirectional conversion circuit 240 of the power conversion system 200 in FIG. 6. The bidirectional conversion circuit 240 includes a transistor T1 to a transistor T4 and an inductor L. Please start from a top side and a right side of each of components in the picture as a first terminal, the inductor L includes a first terminal and a second terminal. The transistor T1 includes a first terminal, a second terminal and a control terminal. The first terminal of the transistor T1 is coupled to the energy tank 220. The second terminal of the transistor T1 is coupled to the second terminal of the inductor L. The control terminal of the transistor T1 is configured to receive a control signal S1 from the controller 230, and is conducted in response to the control signal S1. A first terminal of the transistor T2 is coupled to the second terminal of the inductor L. A second terminal of the transistor T2 is coupled to the energy tank 220. A control terminal of the transistor T2 is configured to receive a control signal S2 from the controller 230, and is conducted in response to the control signal S2. The transistor T1 and the transistor T2 are not conducted at the same time.

A first terminal of the transistor T3 is coupled to the live wire LW. A second terminal of the transistor T3 is coupled to the first terminal of the inductor L. A control terminal of the transistor T3 is configured to receive a control signal S3 from controller 230, and is conducted in response to the control signal S3. A first terminal of the transistor T4 is coupled to the first terminal of the transistor inductor L. A second terminal of the transistor T4 is coupled to the earth wire EW and the second terminal of the transistor T2. A control terminal of the transistor T4 is configured to receive a control signal S4 from the controller 230, and is conducted in response to the control signal S4. The transistor T3 and the transistor T4 are not conducted at the same time.

It is further explained that the circuit architecture of the bidirectional conversion circuit 240 in FIG. 7 is only an example, and the present disclosure is not limited thereto. It will be understood by those of ordinary skill in the art that various modifications and applications may be made without departing from essential characteristics of the aspects. For example, the elements described in detail in the above aspects may be modified. In addition, differences related to these modifications and applications should be construed as being covered by the scope of the invention as defined by the following claims.

Following contents will explain different operating modes of the bidirectional conversion circuit 240 according to the bidirectional conversion circuit 240 in FIG. 7 with an example. For example, assume that the output voltage $V_O$ of the power conversion system 100 (i.e., a voltage difference across the capacitor $C_O$) is 48 V (volts). A voltage range of the energy tank 220 can provide ranges from 24V to 64V. The power conversion system 200 has just started operating, and the energy tank 220 does not store DC power. When the controller 230 is configured to detect that the DC power of the energy tank 220 is lower than the preset charge value, the controller 230 is configured to generate the control signals S1-S4 respectively to switch the bidirectional conversion circuit 240 to the charging mode to make transistor T1 of the bidirectional conversion circuit 240 remain be conducted, the transistor T2 be turned off, and the transistor T3 and the transistor T4 be conducted in turn. At this time, the bidirectional conversion circuit 240 is configured to charge the energy tank 220 from the output terminal of the DC/DC conversion circuit 210 to 48V close to the output terminal of the DC/DC conversion circuit 210.

When the energy tank 220 is charged close to 48V or a preset voltage value of the output terminal of the DC/DC conversion circuit 210, the controller 230 is configured to change the voltage levels of the control signals S1-S4 to switch the bidirectional conversion circuit 240 to the standby mode.

In one embodiment, when a voltage of the energy tank 220 is charged to close to the output voltage 48V, and transistor T3 of the bidirectional conversion circuit 240 reaches a maximum conduction time, the bidirectional conversion circuit 240 is configured to perform high-frequency switching of all transistors T1-T4 as a boost converter so that the voltage of the energy tank 220 can be smoothly charged upward from 48V to slightly high than the output voltage of the DC/DC conversion circuit 210. At this time, the transistor T3 is always conducted, and the transistor T4 is always turned off. The transistor T1 and the transistor T2 perform high-frequency switching, and the bidirectional conversion circuit 240 acts as a boost converter to charge the voltage of the energy tank 220 to a target voltage of 64V.

Then, please refer to FIG. 6 and FIG. 7, when the controller 230 is configured to detect that the bus terminal voltage $V_{BUS}$ is lower than a preset voltage V1 at a time point P1 (i.e., too large load R causes a voltage drop), the controller 230 is configured to generate the control signals S1-S4 respectively to switch the bidirectional conversion circuit 240 to the discharging mode to make the transistor T3 in the bidirectional conversion circuit 240 be conducted, the transistor T4 be turned off, and the transistor T1 and the transistor T2 be conducted in turn, thereby allowing the DC power stored in the energy tank 220 to compensate the output terminal of the DC/DC conversion circuit 210, thereby maintaining a stability of the output voltage $V_O$.

Please refer to the time point P1 in FIG. 2 and FIG. 6, compared with a compensation method of the controller 130 of the power conversion system 100, the controller 230 of the power conversion system 200 is configured to detect the DC power at the output terminal of the DC/DC conversion circuit 210 in real time, and generate the control signals S1-S4 respectively to maintain the output voltage $V_O$ stable in real time.

In one embodiment, please refer to FIG. 5 and FIG. 6, the controller 230 can be configured to detect whether the DC power of the output terminal of the DC/DC conversion circuit 210 (i.e. the voltage level of the output voltage $V_O$) is lower than the preset voltage V2. If the output voltage $V_O$ is lower than the preset voltage V2, the controller 230 will be configured to perform the aforementioned operations to compensate the DC power at the output terminal of the DC/DC conversion circuit 210. Detailed operations have been introduced in the aforementioned paragraphs, and detail repetitious descriptions are omitted here.

Figure 8:
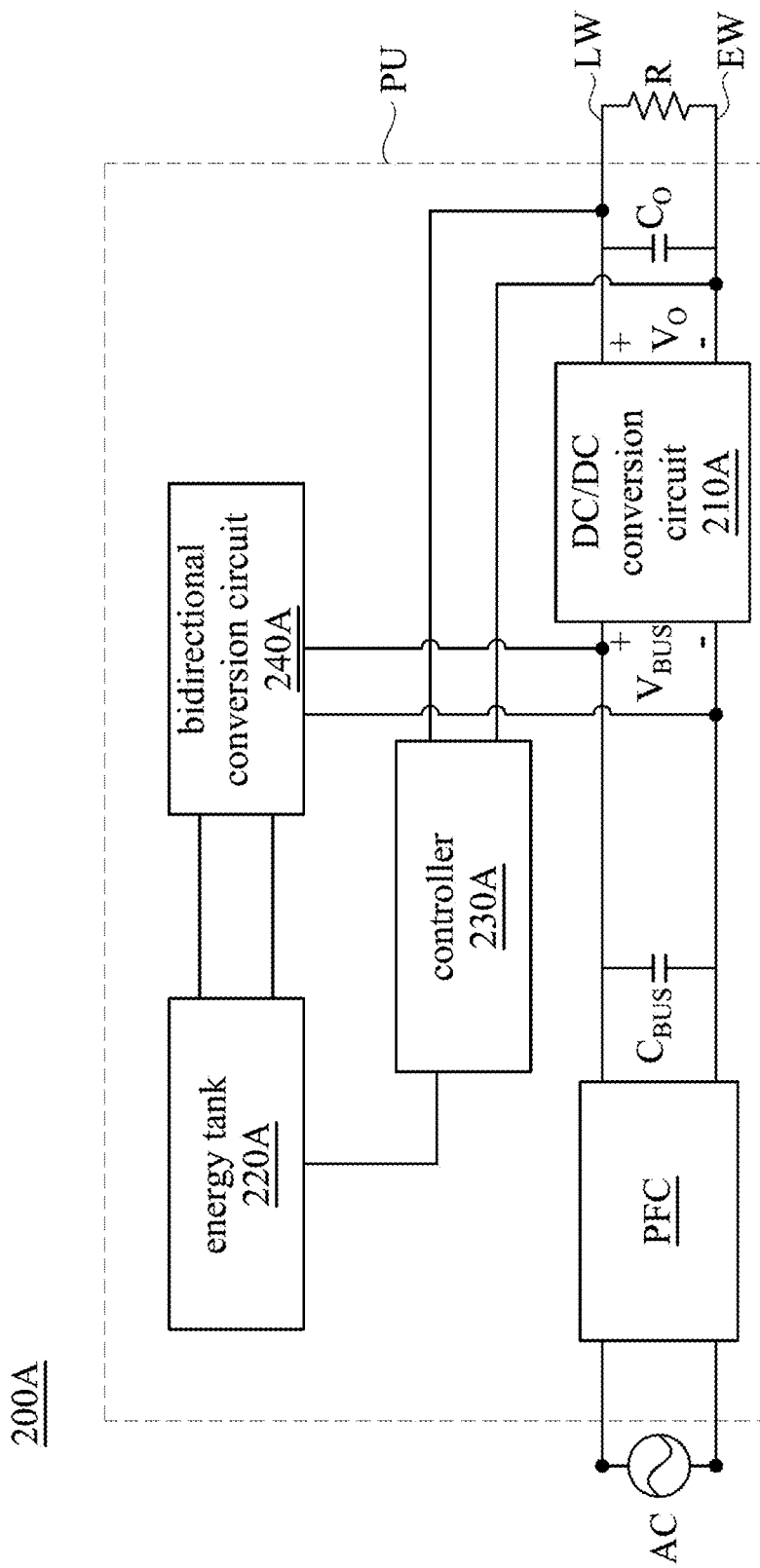
FIG. 8 depicts a schematic diagram of a power conversion system according to one embodiment of the present disclosure.

FIG. 8 depicts a schematic diagram of a power conversion system 200A according to one embodiment of the present disclosure. The power conversion system 200A includes a power device PU. The power device PU includes a DC/DC conversion circuit 210A, an energy tank 220A, a controller 230A, bidirectional conversion circuit 240A and a power factor correction circuit PFC. Connection methods and operations of the DC/DC conversion circuit 210A, the energy tank 220A, the controller 230A, the bidirectional conversion circuit 240A and the power factor correction circuit PFC are respectively similar to connection methods and operations of the corresponding components in the power device PU of the power conversion system 200 in FIG. 5. For the sake of brevity, only differences are described below.

Compared with the embodiment in FIG. 5, the controller 230A is configured to detect the bus terminal (i.e., a voltage difference between two terminals of the capacitor $C_{BUS}$) to instantly control the bidirectional conversion circuit 240A to discharge the energy tank 220A to the input terminal of the DC/DC conversion circuit 210A to stabilize the bus terminal voltage $V_{BUS}$.

In one embodiment, please refer to FIG. 8, the controller 230A can be configured to detect whether the DC power of the output terminal of the DC/DC conversion circuit 210A (i.e. the voltage level of the output voltage $V_O$) is lower than a preset voltage V2. If the output voltage $V_O$ is lower than the preset voltage V2, the controller 230A will be configured to perform the aforementioned operations to compensate the DC power of the input terminal of the DC/DC conversion circuit 210A. Detailed operations have been introduced in the aforementioned paragraphs, and detail repetitious descriptions are omitted here.

Figure 9:
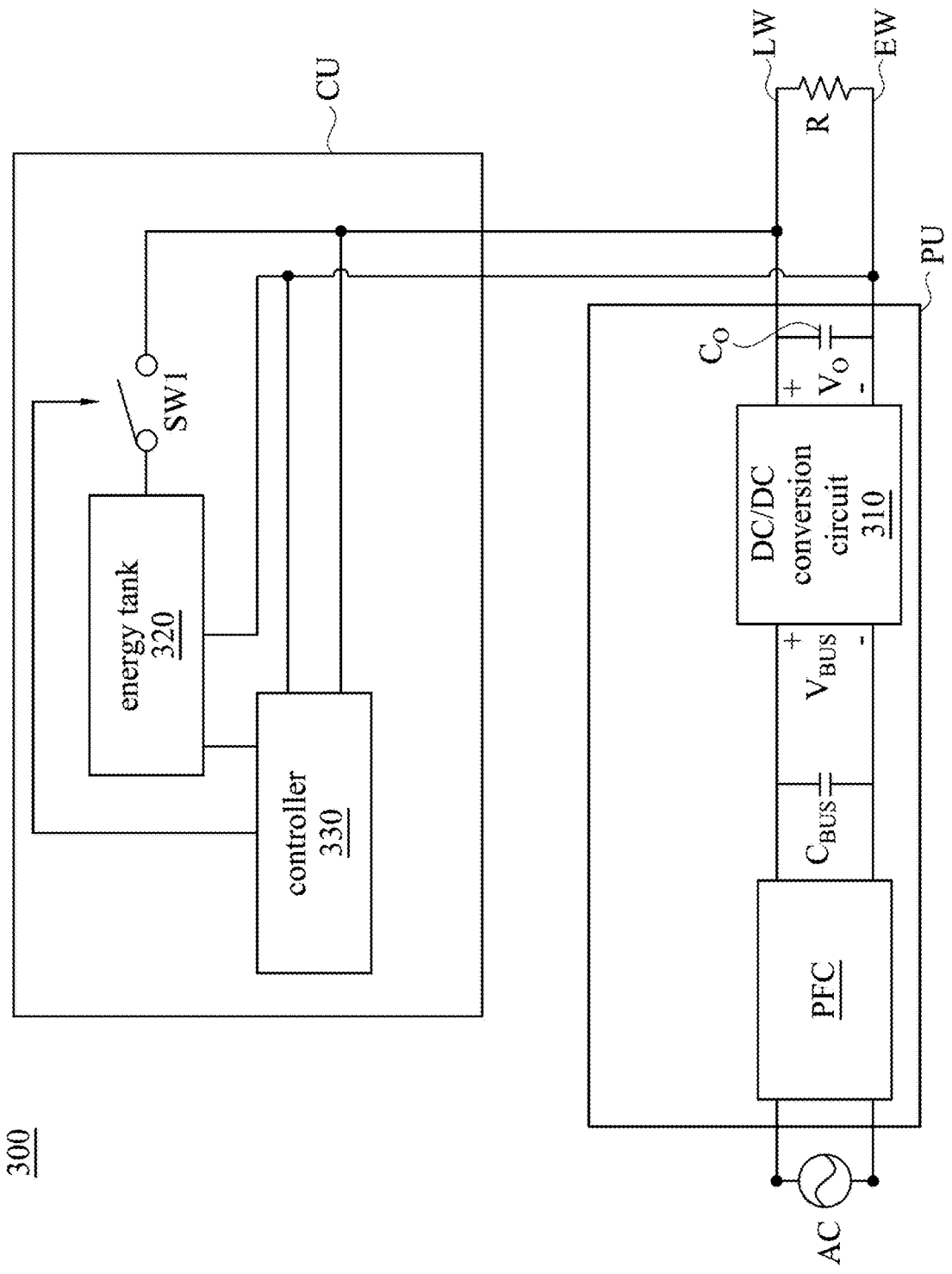
FIG. 9 depicts a schematic diagram of a power conversion system according to one embodiment of the present disclosure.

FIG. 9 depicts a schematic diagram of a power conversion system 300 according to one embodiment of the present disclosure. The power conversion system 300 includes a power device PU and a compensation device CU. Compared with the power conversion system 100 in FIG. 1, the power device PU and the compensation device CU of the power conversion system 300 are not integrally formed. In other words, the power device PU and the compensation device CU can be a corresponding combination device. The power device PU includes a DC/DC conversion circuit 310 and a power factor correction circuit PFC. The compensation device CU includes an energy tank 320, a controller 330 and a switch SW1. In some embodiments, the controller 330 communicates with the power device PU to obtain the bus terminal voltage $V_{BUS}$.

Figure 10:
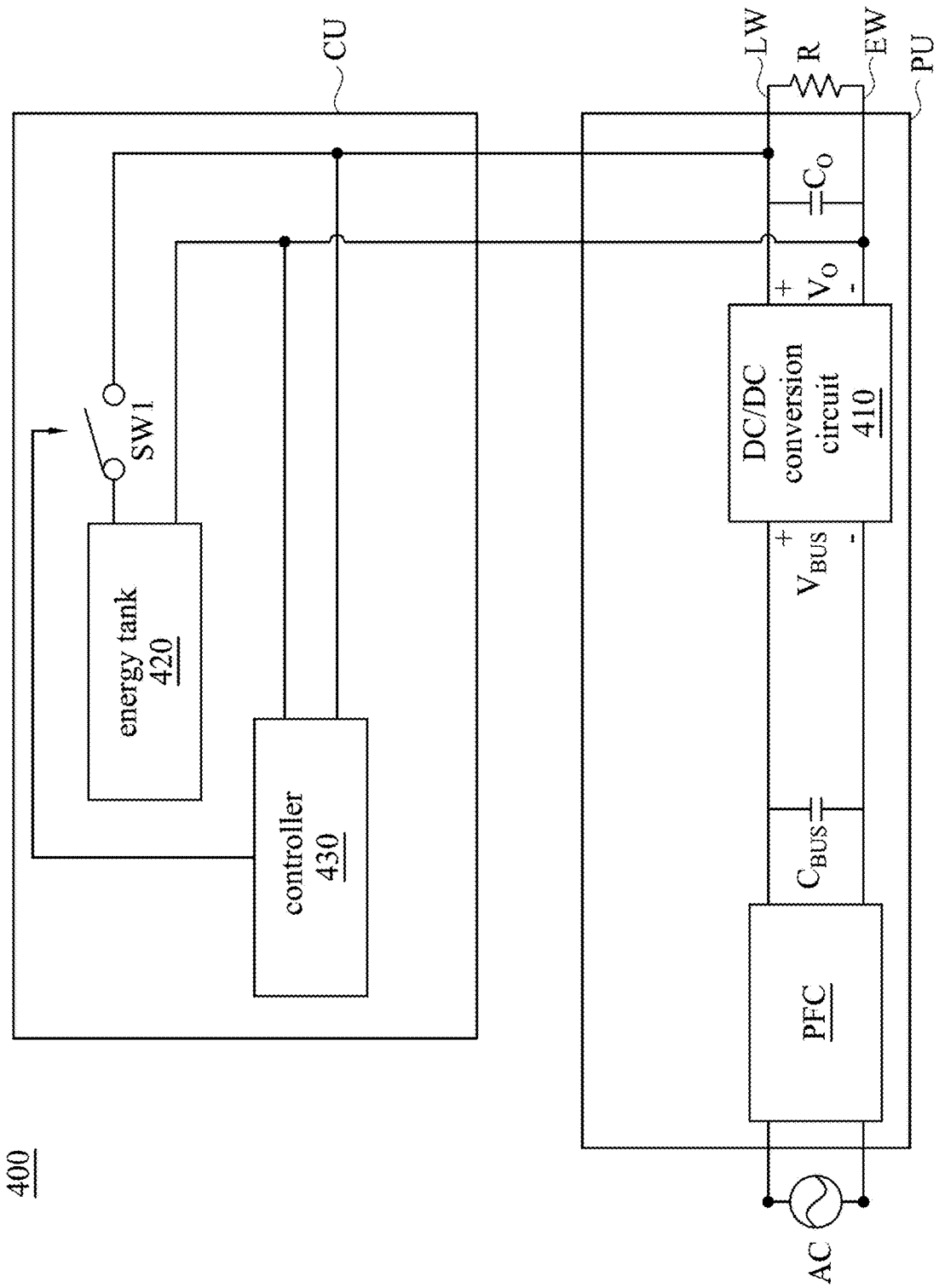
FIG. 10 depicts a schematic diagram of a power conversion system according to one embodiment of the present disclosure.

FIG. 10 depicts a schematic diagram of a power conversion system 400 according to one embodiment of the present disclosure. The power conversion system 400 includes a power device PU and a compensation device CU. Compared with the power conversion system 100A in FIG. 3, the power device PU and the compensation device CU of the power conversion system conversion system 400 are not integrally formed. In other words, the power device PU and the compensation device CU can be a corresponding combination device. The power device PU includes a DC/DC conversion circuit 410 and a power factor correction circuit PFC. The compensation device CU includes an energy tank 420, a controller 430 and a switch SW1. In some embodiments, the controller 430 communicates with the power device PU to obtain the bus terminal voltage $V_{BUS}$.

Figure 11:
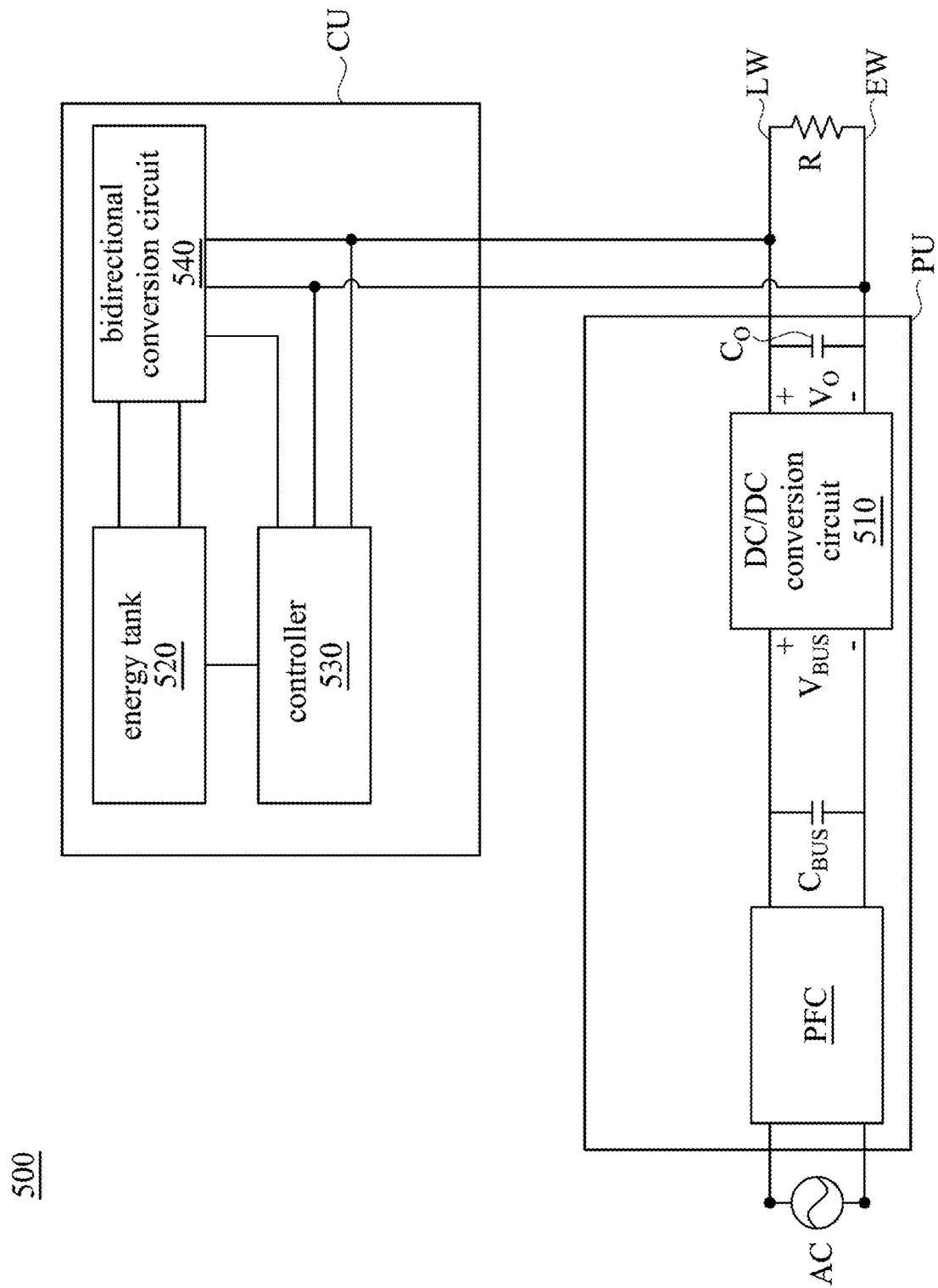
FIG. 11 depicts a schematic diagram of a power conversion system according to one embodiment of the present disclosure.

FIG. 11 depicts a schematic diagram of a power conversion system 500 according to one embodiment of the present disclosure. The power conversion system 500 includes a power device PU and the compensation device CU. Compared with the power conversion system 200 in FIG. 5, the power device PU and the compensation device CU of the power conversion system 500 are not integrally formed. In other words, the power device PU and the compensation device CU can be a corresponding combination device. The power device PU includes a DC/DC conversion circuit 510 and a power factor correction circuit PFC. The compensation device CU includes an energy tank 520, a controller 530 and a bidirectional conversion circuit 540. In some embodiments, the controller 530 communicates with the power device PU to obtain the bus terminal voltage $V_{BUS}$.

Figure 12:
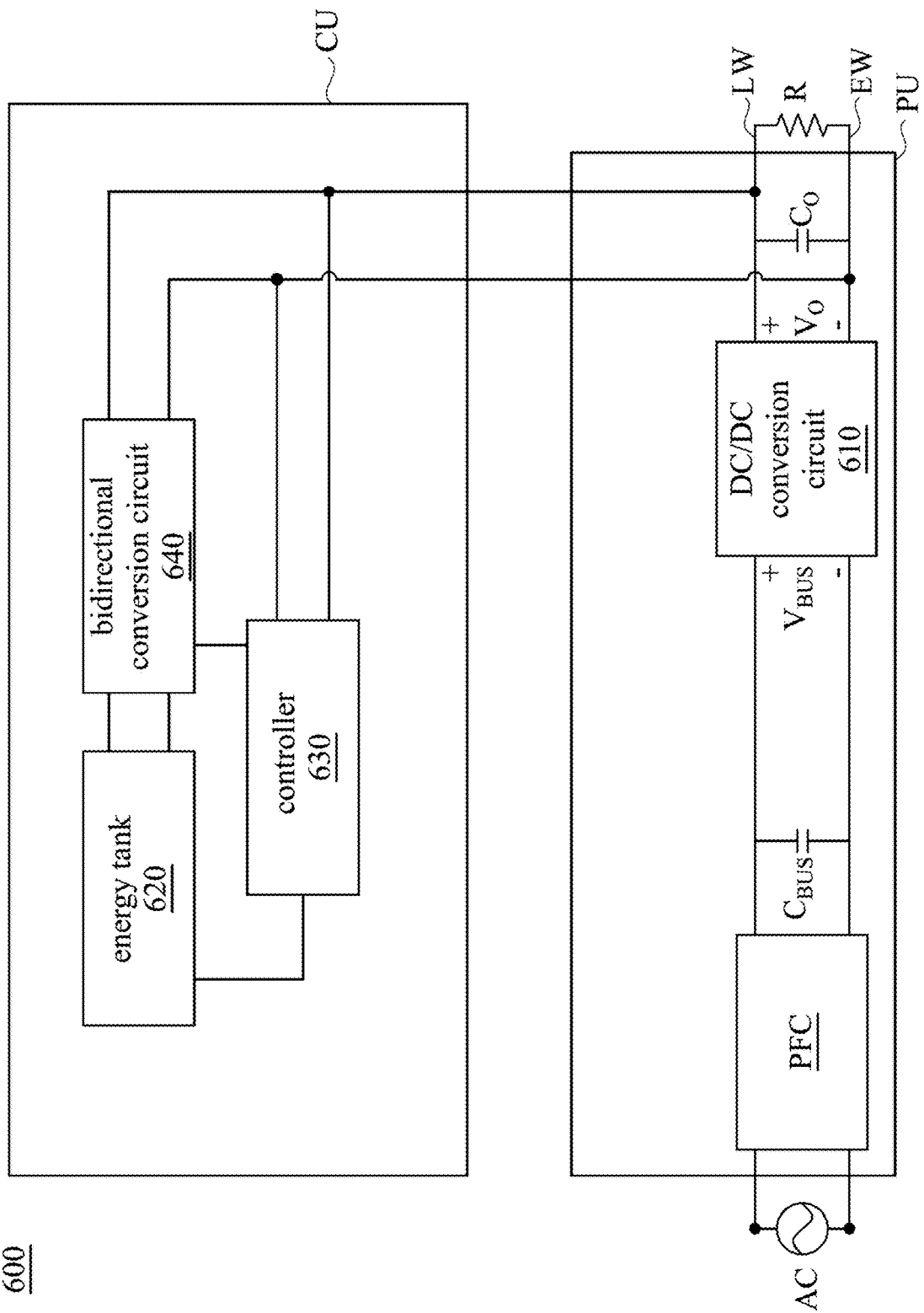
FIG. 12 depicts a schematic diagram of a power conversion system according to one embodiment of the present disclosure.

FIG. 12 depicts a schematic diagram of a power conversion system 600 according to one embodiment of the present disclosure. The power conversion system 600 includes a power device PU and a compensation device CU. Compared with the power conversion system 200A in FIG. 8, the power device PU and the compensation device CU of the power conversion system 600 are not integrally formed. In other words, the power device PU and the compensation device CU can be a corresponding combination device. The power device PU includes a DC/DC conversion circuit 610 and a power factor correction circuit PFC. The compensation device CU includes an energy tank 620, a controller 630 and a bidirectional conversion circuit 640. In some embodiments, the controller 630 is communicatively connected to the power device PU to obtain the bus terminal voltage $V_{BUS}$.

Figure 13:
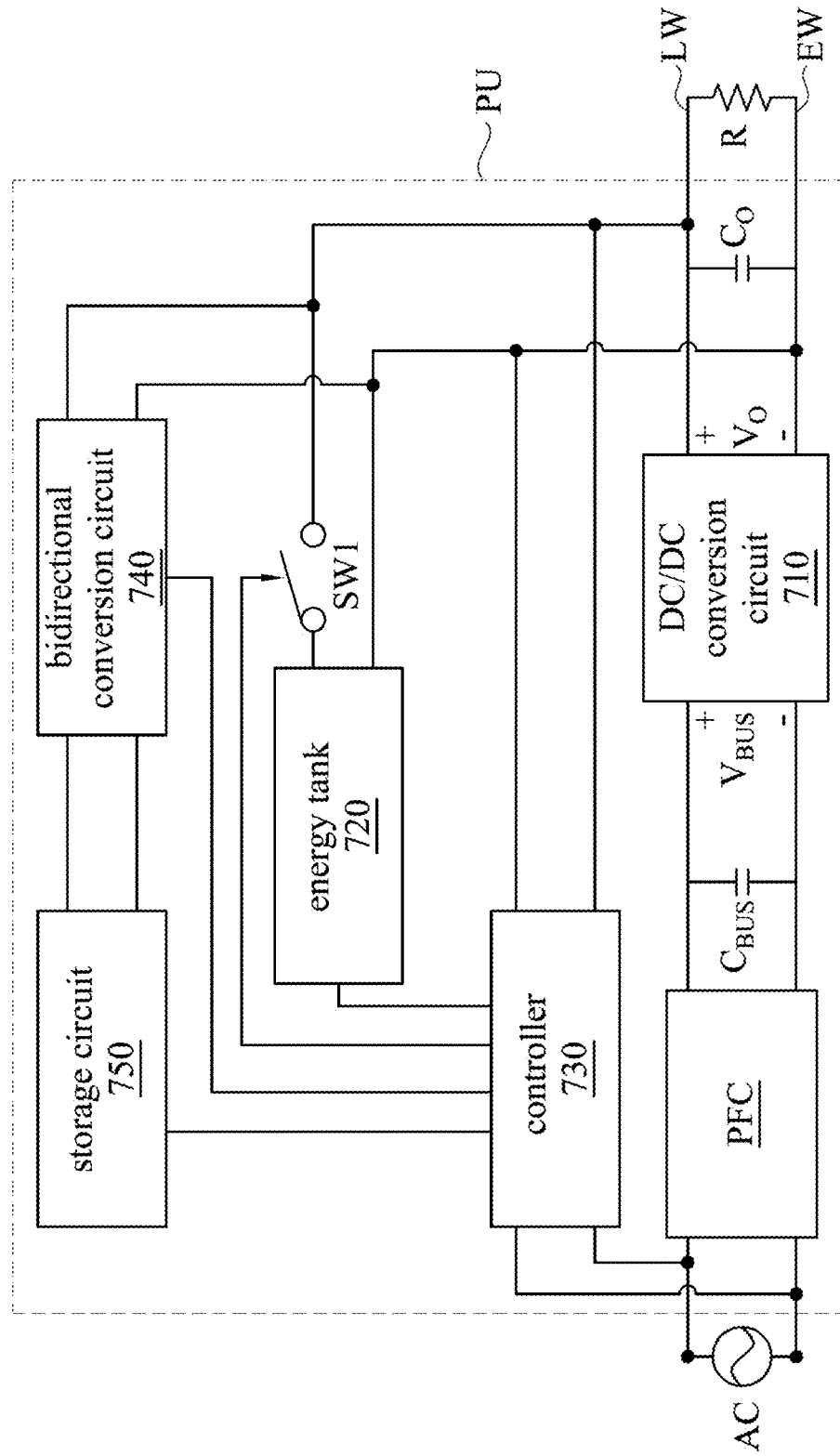
FIG. 13 depicts a schematic diagram of a power conversion system according to one embodiment of the present disclosure.

FIG. 13 depicts a schematic diagram of a power conversion system 700 according to one embodiment of the present disclosure. The power conversion system 700 includes a power device PU. The power device PU includes a DC/DC conversion circuit 710, an energy tank 720, a controller 730, a switch SW1, a bidirectional conversion circuit 740, a storage circuit 750 and a power factor correction circuit PFC. Compared with the power conversion system 100 in FIG. 1, the power device PU additionally adds the bidirectional conversion circuit 740 and the storage circuit 750. The storage circuit 750 is coupled to the DC/DC conversion circuit 710, and is configured to store the DC power. The bidirectional conversion circuit 740 is coupled between the storage circuit 750 and the DC/DC conversion circuit 710.

In one embodiment, when the controller 730 is configured to detect an abnormality in an AC power of the power conversion system 700 (e.g. the AC power is zero and an oscillation voltage of the AC power is less than a preset oscillation voltage), the controller 730 is configured to turn off the switch SW1, and switch the bidirectional conversion circuit 740 to a discharging mode so that the storage circuit 750 provides the DC power to the DC/DC conversion circuit 710.

In one embodiment, the power conversion system 700 may also be implemented as the power device PU and the compensation device CU of the power conversion system 700 in FIG. 10. In one embodiment, the bidirectional conversion circuit 740 and the storage circuit 750 can be disposed in the compensation device CU of the power conversion system 700 as shown in FIG. 10.

The power conversion system 700 in FIG. 13 provides the DC power to the load R when the AC power is out of power to realize an uninterruptible power supply function of the power conversion system 700. In addition, a design of the energy tank 720 and the storage circuit 750 of the present disclosure further extends a service life of an internal battery (not shown in the figure) of the power device PU.

Figure 14:
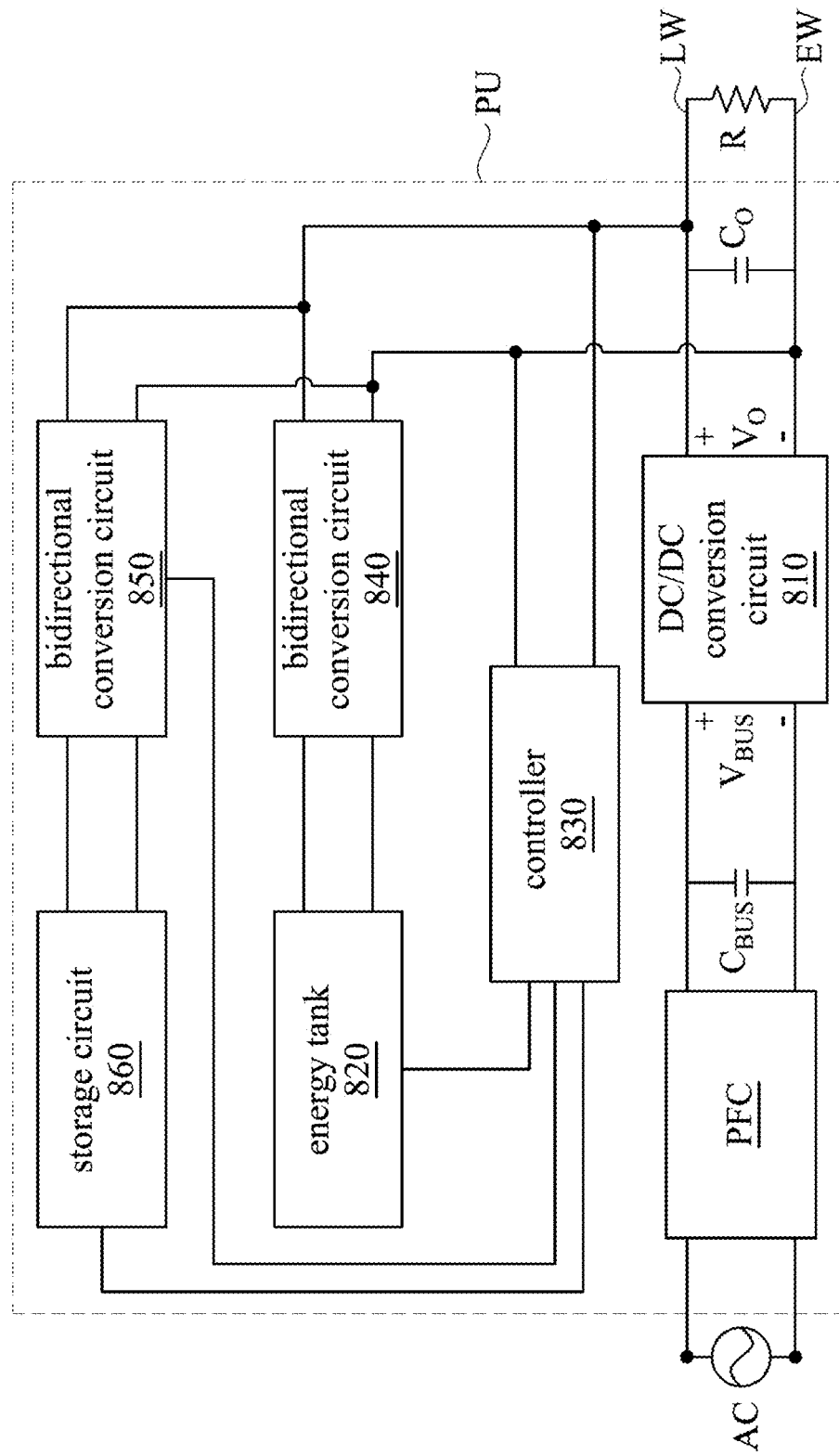
FIG. 14 depicts a schematic diagram of a power conversion system according to one embodiment of the present disclosure.

FIG. 14 depicts a schematic diagram of a power conversion system 800 according to one embodiment of the present disclosure. The power conversion system 800 includes power device PU. power device PU includes a DC/DC conversion circuit 810, an energy tank 820, a controller 830, a bidirectional conversion circuit 840, a bidirectional conversion circuit 850, a storage circuit 860 and a power factor correction circuit PFC. Compare with the power conversion system 200 in FIG. 5, the power device PU additionally adds the bidirectional conversion circuit 840 and the bidirectional conversion circuit 850. The storage circuit 860 is coupled to the DC/DC conversion circuit 810, and is configured to store the DC power. The bidirectional conversion circuit 850 is coupled between the storage circuit 860 and the DC/DC conversion circuit 810.

In one embodiment, when the controller 830 is configured to detect an abnormality in an AC power of the power conversion system 800 (e.g. AC power is zero and an oscillation voltage of the AC power is less than a preset oscillation voltage), the controller 830 is configured to switch the bidirectional conversion circuit 840 to the standby mode, and switch the bidirectional conversion circuit 850 to the discharging mode so that the storage circuit 860 provides the DC power to the DC/DC conversion circuit 810.

The power conversion system 800 in FIG. 14 provides the DC power to the load R when the AC power is out of power to realize an uninterruptible power supply function of the power conversion system 800. In addition, a design of the energy tank 820 and the storage circuit 860 of the present disclosure further extends a service life of an internal battery (not shown in the figure) of the power device PU.

In one embodiment, the power conversion system 800 may also be implemented as the power device PU and the compensation device CU of the power conversion system 500 in FIG. 11. In one embodiment, the bidirectional conversion circuit 850 and the storage circuit 860 can be disposed in the compensation device CU of the power conversion system 500 in FIG. 11.

Based on the aforementioned embodiments, the present disclosure provides a power conversion system. Through a design of a power conversion system of the present disclosure, it can respond to a dynamic changes of the load in real time to control an energy tank to compensate for a voltage drop at a DC bus terminal and a DC output terminal so that a voltage drop can be maintained at a standard voltage without causing current distortion on an AC side and affecting harmonic components of a power grid.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A power conversion system, comprising:
   a DC/DC conversion circuit, configured to convert a first DC power into a second DC power and provide the second DC power to a dynamic load;
   an energy tank, coupled to the DC/DC conversion circuit;
   a switch, coupled between the energy tank and the DC/DC conversion circuit;
   a controller, coupled to the energy tank and the switch, and configured to detect a first voltage of the first DC power and a second voltage of the second DC power respectively to determine a change of the dynamic load, wherein when the controller is configured to detect that the first voltage is lower than a first preset voltage or detect that the second voltage is lower than a second preset voltage, the controller is configured to conduct the switch so that a third DC power stored in the energy tank is provided to the DC/DC conversion circuit to compensate one of the first DC power and the second DC power;
   a storage circuit, coupled to the DC/DC conversion circuit, and configured to store a fourth DC power; and
   a bidirectional conversion circuit, coupled between the storage circuit and the DC/DC conversion circuit, wherein when the controller is configured to detect an abnormality in a AC power of the power conversion system, the controller is configured to turn off the switch, and to switch the bidirectional conversion circuit to a discharging mode so that the storage circuit provides the fourth DC power to the DC/DC conversion circuit.

2. The power conversion system of claim 1, wherein the switch is coupled to an output terminal of the DC/DC conversion circuit, wherein when the controller is configured to detect that the first voltage is lower than the first preset voltage, the controller is configured to conduct the switch so that the third DC power is provided to the output terminal to compensate the second DC power.

3. The power conversion system of claim 1, wherein the switch is coupled to an input terminal of the DC/DC conversion circuit, wherein when the controller is configured to detect that the first voltage is lower than the first preset voltage, the controller is configured to conduct the switch so that the third DC power is provided to the input terminal to compensate the first DC power.

4. The power conversion system of claim 1, wherein the switch is coupled to an output terminal of the DC/DC conversion circuit, wherein when the controller is configured to detect that the second voltage is lower than the second preset voltage, the controller is configured to conduct the switch so that the third DC power is provided to the output terminal to compensate the second DC power.

5. The power conversion system of claim 1, wherein the switch is coupled to an input terminal of the DC/DC conversion circuit, wherein when the controller is configured to detect that the second voltage is lower than the second preset voltage, the controller is configured to conduct the switch so that the third DC power is provided to the input terminal to compensate the first DC power.

6. The power conversion system of claim 1, wherein the controller is further configured to detect whether the third DC power of the energy tank is lower than a preset charge value, wherein when the third DC power of the energy tank is lower than the preset charge value, the controller is further configured to conduct the switch so that one of the first DC power and the second DC power charges the energy tank.

7. The power conversion system of claim 1, wherein the controller is further configured to detect whether the fourth DC power of the storage circuit is lower than a preset charge value, wherein when the fourth DC power of the storage circuit is lower than the preset charge value, the controller is further configured to turn off the switch, and to switch the bidirectional conversion circuit to a charging mode to charge the storage circuit, wherein when the fourth DC power of the storage circuit is not lower than the preset charge value, the bidirectional conversion circuit is switched to a standby mode.

8. The power conversion system of claim 1, further comprising:
   a power device, comprising the DC/DC conversion circuit; and
   a compensation device, coupled to the power device, wherein the compensation device comprises the energy tank, the switch and the controller, wherein the power device and the compensation device are not integrally formed.

9. The power conversion system of claim 8, wherein the compensation device further comprises:
   a storage circuit, coupled to the DC/DC conversion circuit, and configured to store a fourth DC power; and
   a bidirectional conversion circuit, coupled between the storage circuit and the DC/DC conversion circuit, wherein when the controller is configured to detect an abnormality in a AC power of the power conversion system, the controller is configured to turn off the switch, and to switch the bidirectional conversion circuit to a discharging mode so that the storage circuit provides the fourth DC power to the DC/DC conversion circuit.

10. A power conversion system, comprising:
   a DC/DC conversion circuit, configured to convert a first DC power into a second DC power and provide the second DC power to a dynamic load;
   an energy tank, coupled to the DC/DC conversion circuit;
   a first bidirectional conversion circuit, coupled between the energy tank and the DC/DC conversion circuit;
   a controller, coupled to the energy tank and the first bidirectional conversion circuit, wherein the controller is configured to detect a first voltage of the first DC power and a second voltage of the second DC power to determine a change of the dynamic load respectively, wherein when the controller is configured to detect that the first voltage is lower than a first preset voltage or detect that the second voltage is lower than a second preset voltage, the controller is configured to conduct the first bidirectional conversion circuit, so that a third DC power stored in the energy tank is provided to the DC/DC conversion circuit to compensate one of the first DC power and the second DC power;
   a storage circuit, coupled to the DC/DC conversion circuit, and configured to store a fourth DC power; and
   a second bidirectional conversion circuit, coupled between the storage circuit and the DC/DC conversion circuit, wherein when the controller is configured to detect an abnormality in an AC power of the power conversion system, the controller is configured to switch the first bidirectional conversion circuit to a standby mode, and to switch the second bidirectional conversion circuit to a discharging mode so that the storage circuit provides the fourth DC power to the DC/DC conversion circuit.

11. The power conversion system of claim 10, wherein the first bidirectional conversion circuit is coupled to an output terminal of the DC/DC conversion circuit, wherein when the controller is configured to detect that the first voltage is lower than the first preset voltage, the controller is configured to conduct the first bidirectional conversion circuit so that the third DC power is provided to the output terminal to compensate the second DC power.

12. The power conversion system of claim 10, wherein the first bidirectional conversion circuit is coupled to an input terminal of the DC/DC conversion circuit, wherein when the controller is configured to detect that the first voltage is lower than the first preset voltage, the controller is configured to conduct the first bidirectional conversion circuit so that the third DC power is provided to the input terminal to compensate the first DC power.

13. The power conversion system of claim 10, wherein the first bidirectional conversion circuit is coupled to an output terminal of the DC/DC conversion circuit, wherein the controller is configured to detect that the second voltage is lower than the second preset voltage, the controller is configured to conduct the first bidirectional conversion circuit so that the third DC power is provided to the output terminal to compensate the second DC power.

14. The power conversion system of claim 10, wherein the first bidirectional conversion circuit is coupled to an input terminal of the DC/DC conversion circuit, wherein when the controller is configured to detect that the second voltage is lower than the second preset voltage, the controller is configured to conduct the first bidirectional conversion circuit so that the third DC power is provided to the input terminal to compensate the first DC power.

15. The power conversion system of claim 10, wherein the controller is further configured to detect whether the third DC power of the energy tank is lower than a preset charge value, wherein when the third DC power of the energy tank is lower than the preset charge value, the controller is further configured to switch the first bidirectional conversion circuit to a charging mode to charge the energy tank, wherein when the third DC power is not lower than the preset charge value, the controller is further configured to switch the first bidirectional conversion circuit to a standby mode.

16. The power conversion system of claim 10, wherein the controller is further configured to detect whether the fourth DC power of the storage circuit is lower than a preset charge value, wherein when the fourth DC power of the storage circuit is lower than the preset charge value, the controller is further configured to switch the second bidirectional conversion circuit to a charging mode to charge the storage circuit, wherein when the fourth DC power of the storage circuit is not lower than the preset charge value, the second bidirectional conversion circuit is switched to the standby mode.

17. The power conversion system of claim 10, further comprising:
   a power device, comprising the DC/DC conversion circuit; and
   a compensation device, coupled to the power device, wherein the compensation device comprises the energy tank, the first bidirectional conversion circuit and the controller, wherein the power device and the compensation device are not integrally formed.

18. The power conversion system of claim 17, wherein the compensation device further comprises:
   a storage circuit, coupled to the DC/DC conversion circuit, and configured to store a fourth DC power; and
   a second bidirectional conversion circuit, coupled between the storage circuit and the DC/DC conversion circuit, wherein when the controller is configured to detect an abnormality in a AC power of the power conversion system, the controller is configured to switch the first bidirectional conversion circuit to a standby mode, and to switch the second bidirectional conversion circuit to a discharging mode so that the storage circuit provides the fourth DC power to the DC/DC conversion circuit.

* * * * *